United States Patent [19]

Tavares

[11] Patent Number: 5,749,949
[45] Date of Patent: *May 12, 1998

[54] ANTI-ABRASION INK ADDITIVES AND PRINTING INKS CONTAINING SUCH ADDITIVES

[75] Inventor: Bruce Tavares, Blairstown, N.J.

[73] Assignee: Rheox, Inc., Hightstown, N.J.

[*] Notice: The term of this patent shall not extend beyond the expiration date of Pat. No. 5,591,796.

[21] Appl. No.: 758,069

[22] Filed: Nov. 27, 1996

[51] Int. Cl.⁶ .................... C09D 11/02; C09D 11/12
[52] U.S. Cl. ............... 106/313; 106/31.62; 106/272; 106/285; 523/160; 523/161
[58] Field of Search .................. 106/31.27, 31.3, 106/31.6, 31.62, 272, 285; 523/160, 161

[56] References Cited

U.S. PATENT DOCUMENTS

| | | | |
|---|---|---|---|
| 3,619,249 | 11/1971 | Canon | 428/336 |
| 5,024,700 | 6/1991 | Britton, Jr. | 106/31.62 |
| 5,158,606 | 10/1992 | Carlick et al. | 106/31.61 |
| 5,372,635 | 12/1994 | Wasilewski et al. | 106/31.67 |
| 5,591,796 | 1/1997 | Wisniewski et al. | 523/161 |

*Primary Examiner*—Helene Klemanski
*Attorney, Agent, or Firm*—Michael J. Cronin

[57] ABSTRACT

An improved anti-abrasion/slip ink additive is disclosed comprising a mixture of sintered polytetrafluoroethylene and pharmaceutical grade petrolatum. As an alternative, additional material, such as phenolic resins and oils can be added to the mixture. The additives permit the less costly manufacture of printing inks, most particularly heat set inks and results in print which has improved rub, slip and anti-mar characteristics.

17 Claims, No Drawings

ANTI-ABRASION INK ADDITIVES AND PRINTING INKS CONTAINING SUCH ADDITIVES

BACKGROUND OF THE INVENTION

1. Brief Description of the Invention

This invention relates to anti-abrasion additives for printing inks. Such additives are chemicals mixed or dispersed into printing ink formulations in order to impart to such inks resistant strength and anti-rub properties after printing with the ink formulation has occurred. These products are also often referred to as anti-mar, anti-rub or slip ink additives. Print on paper using ink containing these additives, for example, will then be protected against abrasion while maintaining slip properties, defined below, when the ink, and the paper or other material, is subjected to a variety of smearing, smudging and marring forces. Such forces occur during use, shipping or handling of the paper. The invention hereof is most useful for heat set, sheet fed and UV coatable printing inks.

2. Description of the Prior Art

It has been known that printing ink must be provided with "strength" properties, so that after printing on paper or other substrates, the printing ink will not ruboff when the substrate surface is subjected to the normal abrasive forces encountered in use and handling. Heat-set inks, for example, have been made with special additives, designed to provide these properties. The printing ink, as so modified by the ink manufacturer, will possess improved mar resistance after it is used to print. Marring of print detracts from the readability of the message print is intend to convey to the reader. Treated ink, after addition of these special additives, often also will have improved slip properties. Slip properties permit other printed pages to glide easily over the ink on a printed page without causing the ink to smudge.

Anti-abrasion additives are added into printing ink formulations during manufacture by being mixed, or ground, into the ink formulation with the pigments used to make ink, added as a part of the final ink blend, or introduced at other times. Such additives are, for example, often dispersed into the precursor ink solvents or resins.

Anti-abrasion ink additives in commercial use today are normally in wax-like, solid or powder form. Harder waxes have proved difficult to mix satisfactorily or disperse into ink systems as additives. It has often been necessary to melt the wax additive by electric or other type of heating as part of making the final printing ink. Anti-abrasion or rub qualities imparted by common commercial waxes are highly influenced by the melting temperature of a particular wax. Many waxes added to inks often result in only a small reduction in rub-off, not its complete elimination the heat and movement imparted by the friction of constant rubbing in practice sometimes results in particles of the ink printed film often to continue to spread to unprinted areas. In view of these and other difficulties, anti-abrasion ink additives have not reached their full market potential.

The introduction of anti-abrasion hard waxes into inks in order to solve the rub-off problem, however, has introduced other problems. Often, the more wax additive that is added to improve rub resistance, the more significant the decrease in desirable gloss of the printed ink from the gloss, as printed, to a lower level, which is particularly unsatisfactory for quality magazines or prints. It is very important to a publisher to minimize this reduction in gloss of printed ink because of abrasion forces. Accordingly, in most applications a compromise has to be achieved between the desired level of anti-rub properties and the amount of gloss reduction.

Since many anti-abrasion waxes are either solids or in powder form, they are often difficult to disperse into formulations, which are essentially liquid systems. Ink manufacturers have long looked for smoother and more easily handled products to use as anti-abrasion additives, for ease of ink manufacture alone. An additive which requires heating, as do most hard wax anti-abrasion additive products, also presents additional manufacturing costs and problems which ink manufacturers prefer to avoid. In addition, there is the factor of increased cost associated with an ink containing relatively expensive anti-mar additives. In the case of newspaper and certain magazine news inks, cost is an important factor and, therefore, at the present time many news inks do not ordinarily utilize anti-abrasion additives, and inexpensive magazine inks use only limited varieties and in small amounts.

Polyethylene waxes have been used as anti-abrasion additives in the ink industry. These waxes are added normally incorporated by the ink manufacturer as dispersions of the wax in resins, generally of the same type characteristic as the ink formulations into which they are to be incorporated. Waxes prepared with certain types of polytetrafluoroethylene are known especially targeted for heatset inks, where the temperature of the drying apparatus does not cause them to significantly soften or melt. Particular kinds of polytetrafluoroethylene-based powder waxes have also been added directly to in-process inks using shear forces.

The incorporation of many commercial anti-abrasion waxes presents similar conventional handling problems as are encountered with the dispersion of other types of solid or nearly-solid materials. When added to ink systems, these types of waxes can agglomerate into clumps. When dispersed directly, "uneven wetting out" of the product has been reported resulting in the formation of lumps or globules whose core is still the wax. Such agglomeration can be reduced in many cases by adding the wax to the system slowly, with agitation. Such slow dissolution however often influencies the efficiency of specific ink manufacturing operations. Some waxes have proved difficult to incorporate in industrial ink-making processes because they often require long periods of time to dissolve. Both in simple ink resin solutions and, more particularly, in ink formulations comprising other chemicals and ingredients, extended agitation and aging periods are necessary before correct viscosity and dispersion can be attained.

Ink manufacturers have continually searched for simple, fast and effective ways of mixing anti-abrasion additives into ink systems. Because of this continuing desire and investigation, some commercial products are used by ink manufacturers as pourable liquid "concentrates". These additives, in liquid form for inks and other compositions, usually involve taking the wax sold by a anti-abrasion wax manufacturing company and preparing, by the ink manufacturer, at his ink manufacturing operation a pre-mix liquid mixture or blend of the anti-abrasion wax and the ink vehicle being used to incorporate into the ink formulation.

Anti-rub wax additives commercially available on the market include Protech 120, sold by Carroll Scientific, Inc. which is described as an 83% active compound containing a form of DuPont virgin Teflon® and a synthetic wax blend, with a petroleum distillate vehicle. Another company, Lawter International, sells an anti-rub hard wax ink additive product, designated Lawter SA-1021, which comprises a phenolic resin, some type of polytetrafluoroethylene, and a petroleum oil. Commercial anti-rub wax additives containing polytetrafluoroethylene may have also been sold in the past which may have also contained small amounts of some type of polyalphaolefins. It is also believed that a past commercial ink additive product of the Sun Chemical Company, which is no longer available for sale, used a combination of unsintered PTFE of large and varying particle size in combination with other ingredients including low grade petrolatum. It is further believed such product was withdrawn from commerce because it did not satisfy the marketplace.

A number of prior art patents describe the use of ink additives of the general type described above. U.S. Pat. No. 5,024,700 describes the use of triethanolamine as an ink additive, which among other properties, is described as providing improved rub resistance to oil and resin-based ink compositions. The product is claimed to be particularly useful for newspaper printing applications in this regard. U.S. Pat. No. 5,035,836 shows a resistive ink using a polymer-based binder and an electrically conductive solid lubricant.

Other patents describe the use of polytetrafluoroethylene in non-ink applications, see for example U.S. Pat. No. 5,159,019 which teaches the use of polytetrafluoroethylene in a resin mixture to provide abrasion resistance to injection molded plastic materials. U.S. Pat. No. 4,096,207 shows the use of polytetrafluoroethylene to improve the abrasion resistance of elastomers of a type which are in dynamic contact with metals.

U.S. Pat. No. 5,158,606 describes a printing ink composition with a high degree of rub-off resistance comprising a) a dispersion of a polymer latex emulsified in said dispersion. The patent further discloses that where cost is not of paramount concern, a polytetrafluoroethylene wax with petrolatum can be added to the oil/polymer latex ink composition. U.S. Pat. No. 3,843,570 describes a porous material comprising polytetrafluoroethylene obtained by polymerizing a monomer capable of forming a resin and discloses that the material is suitable with inks.

OBJECT OF THE INVENTION

It is an object of this invention to provide an anti-rub ink additive with improved mar resistance and anti-rub properties as compared to existing additives.

Accordingly, it is a further object of the present invention to solve or substantially alleviate the problems created by most present day hard wax-like ink anti-abrasion additives. It is, therefore, a more specific object of the present invention to provide a slip, anti-rub and anti-mar ink additive (defined as an anti-abrasion additive) which is useful for increasing the performance properties of inks in an improved efficient manner. The additive maintains good gloss degradation properties in the ink formulations in which it is used.

Along with the obvious advantages and cost savings that can be realized in shipping a anti-abrasion additive, such a product has the added advantage of being largely free of resins and solvents.

DESCRIPTION OF THE INVENTION

In one embodiment, the anti-abrasion additive composition for ink formulations of this invention is a mixture comprising:

a) 40 to 70 parts by weight of sintered polytetrafluoroethylene and
b) 30 to 60 parts by weight of one or more pharmaceutical-grade petrolatums.

The combination of sintered polytetrafluoroethylene with pharmaceutical grade petrolatum in the above defined proportion leads to a unique cost effective additive having synergistic properties which imparts good slip, abrasion resistance, low misting and mar resistance when dispersed into ink.

The parts by weight are relative of one of the above two ingredients to the other. The mixture may contain additional ingredients including resins and oils. It is most preferred that an anti-abrasion additive composition containing additional ingredients have, by weight of the entire composition about 50–60, or more of the two specific materials described above.

Polytetrafluoroethylene (PTFE) is a polymer of tetrafluoroethylene. The substance is essentially a straight very long molecular chain of the repeating unit $|\!-\!CF_2\!-\!CF_2\!-\!]_n$. As formed it has a milk-white color, and can be molded by powder metallurgy techniques, involving mixing with a diluent that is subsequently removed. PTFE is usually produced as a white thermoplastic powder having a melting point of about 621° F. This material as made is characterized by chemical inertness, high service temperature, excellent electrical properties and a low coefficient of friction.

PTFE was originally invented by scientists employed by E. I. DuPont de Nemours and Company, Inc. (DuPont) and is today still sold by DuPont under the trademark Teflon®. DuPont today provides the product in various virgin and reprocessed grades, and in various particle sizes and grinds.

Polytetrafluoroethylene is often industrially produced by the polymerization of tetrafluoroethylene monomers dispersed in an aqueous phase either in the form of emulsion or suspension in the presence of an emulsifying or a dispersing agent, using free radical-generators as catalysts. It is known that said process can be carried out by initiating the polymerization with ionizing radiation instead of using free radical-generators in the presence of either emulsifying or dispersing agents. PTFE retains useful unchanged properties up to 350°–450° C., and are essentially non flammable at these temperatures. PTFE is highly resistant to oxidation and action of chemicals including strong acids, alkalines, and oxidizing agents, and is resistant to nuclear radiation and UV rays, ozone, and weathering. PTFE has been and is used in gaskets, seals, flexible hose, coatings for rockets and space vehicles, chemical process equipment, coatings for coaxial coils, spacers, insulators, wire coatings and tape in electrical and electronic fields, bearings, seals, piston rings, felts, packings and bearings.

Tetrahalo-substituted ethylenes, most specifically PTFE, are utilized as starting materials in the preparation of homopolymeric substances and of copolymers. PTFE finds a wide variety of uses in commercial applications in addition to those discussed above. For example, the polymer is most well known as a thin coating for cooking utensils such as frying pans or pots, whereby the problem of food and burnt remnants of food adhering to the surface of the cooking utensil is eliminated. The various uses of polytetrafluoroethylene stem from the physical properties of the polymer, such as its being nonflammable, as well as being highly resistant to oxidation and to the action of chemicals including strong acids, alkalis, and oxidizers.

The preferred forms of PTFE useful for the instant invention include high molecular weight types (as high as 40 million), which have been sintered and pre-ground and are in a powder-form. As a preferred component, the PTFE has also been subjected to some degree of irradiation.

PTFE particularly found useful for this invention can be obtained as a special order product from a variety of companies, including DuPont, Royce Company, Imperial Chemicals International, Ltd. (ICI), Hoescht (Germany), Cray Valley, Ltd., North American Fluorpolymer, Shamrock/MP Company, Ausimont, Daikin, and PTK International Limited along with numerous others.

PTFE used for this invention must be sintered during or after its fabrication. This sintering involves the agglomeration of PTFE at temperatures slightly below or slightly above its melting point. Such sintering is believed to increase the PTFE's density and strength as a ink additive. While heat and pressure are essential for sintering, decrease in the surface area of the PTFE is probably the more important factor to achieve the desired results of this invention. Some types of polytetrafluoroethylene powder preferred for this invention are preformed under pressure into a desired shape, and then sintered at atmospheric pressure in an oven at a temperature in the range of from about 700° F. to about 750° F. Other types of useful PTFE powders can be preformed under pressure and sintered under pressure, normally at a temperature in the range of from about 600° F. to about 750° F. According to U.S. Pat. No. 3,766,031, as of the date of the patent, none of these sintered materials could readily be processed into fine particles. For example, a sintered polytetrafluoroethylene is described in the patent which can only be reduced by high impact pulverization to the size range of from 100 to 200 mesh (149 to 74 microns), and this can be accomplished only with the associated use of coolants, such as liquid carbon dioxide or liquid nitrogen.

Many types of sintered PTFE powder useful for this invention are often referred to as "granular," since they are of a small particle size, and have a grainy texture in that the particles are not smooth and even-shaped. In the present invention, irradiated sintered PTFE in powder form is preferred.

Irradiation of sintered PTFE is normally preferred to facilitate micronization of PTFE into a useable powder form for the use of this invention; however, irradiation of unsintered PTFE can also produce PTFE of the average particle size discussed below —see U.S. Pat. No. 4,036,718, which shows small micron size unsintered PTFE. It is also believed that non-irradiation proprietary processes are today employed by some suppliers which produce commercially available small particle size PTFE useful for this invention.

The term "irradiation" when used with PTFE is defined for purpose of this invention as exposure to wavelengths shorter than those of visible light. This includes treatment with alpha-rays, beta-rays, gamma-rays, X-rays, electron beams, ultra-violet (UV) rays, neutron beams, proton beams, and the like. Particularly preferred for this invention are virgin irradiated sintered grades and similar reprocessed grades; specific useful irradiated sintered PTFE types include virgin granular products.

Micronization of the sintered PTFE to a particle size of about 2 to 20 microns is preferred for this invention. Sintered PTFE having an average particle size of about 2 to about 10 microns is more preferred with 2 to 5 microns (with less than 1% of the particles being greater than 10 microns) most preferred. A micron is one millionth ($10^{-6}$) of a meter or 10,000 Angstroms. Micronization can be accomplished by a variety of techniques, including milling and grinding, all known to the art.

Average and median particle size can be determined by mesh and screen tests, well known in the art, as well as, by use of other more accurate tests when dealing with finely divided PTFE. See, for example, the tests described in U.S. Pat. No. 3,983,200 (air sedimentation rate using Stokes law) and U.S. Pat. No. 4,036,718 (optical testing).

Both off-specification and recycled or reprocessed sintered PTFE, as well as virgin PTFE, can be utilized to make products useful in this invention. Mixtures of various types of PTFE are also useful. A most preferred PTFE useful for this invention would be an irradiated, sintered, granular-type product which had been micronized to about a 2.5 micron average particle size. PTFE of this type is commerially available from some of the suppliers mentioned above.

The second critical element for producing the additives of this invention is pharmaceutical grade petrolatum. This is also sometimes referred to as laboratory grade petrolatum.

Petrolatum is a mass of salve-like consistency obtained from crude oil and is chemically related to white mineral oil. In contrast to white mineral oil, which consists mainly of hydrocarbons that are liquid at ordinary temperatures, petrolatum is most often a mixture of solid and liquid hydrocarbons. Most petrolatums made are largely slack wax and are of low grade, with a high oil content.

Petrolatum is generally obtained from paraffin-base and mixed-base crude oils. The method of manufacture varies with the type of petroleum used, the grade of petrolatum desired and the general program of the individual refinery. The refining procedure, however, almost always conforms with the following.

Crude oil is first subjected to a fractional distillation to obtain a distillation residue of a predetermined viscosity. Care is taken not to crack the residue by excess heat; otherwise, the crude petrolatum obtained in the next operation may be unsuitable for the production of finished petrolatum from the viewpoint of structure. The residue is freed from asphalt by treatment with a solvent, such as propane, prior to the dewaxing operation. The distilled, de-asphalted residue is then dewaxed to yield crude petrolatum and heavy lubricating oil. Dewaxing is usually accomplished by dissolving the residue in special solvent, such as a combination of toluene and methyl-ethyl ketone, chilling to obtain crystallization and then filtered, usually by means of a rotating vacuum filter.

The product obtained by this process is then carefully distilled to remove all traces of the dewaxing solvent and as such is known as crude petrolatum. The melting point, oil content, and other properties of the crude petrolatum can be controlled by the temperature at which filtration takes place, solvent ratio employed, and the geographic origin of the crude oil.

Since crude petrolatum is only one, and possibly the lesser important, of the two products obtained by the dewaxing operation, the refining step is very delicate to obtain pharmaceutical grade petrolatum. The refiner must not only produce a crude petrolatum which will ultimately yield the desired U.S. Pharmacopeia (USP) petrolatum useful for this invention, but must at the same time make sure that the lubricating oil obtained will meet its own manufacturing specifications. Various crude oils require specific conditions of fractional distillation and dewaxing, and this can further complicates the refiner's processing.

The crude petrolatum is then purified to meet the USP and FDA purity requirements by high pressure/high temperature hydrogenation.

The USP specifications for pharmaceutical grade petrolatum generally require the following:

1. Color—yellowish to light amber
2. Specific Gravity—0.815 to 0.880 at 60° C.
3. Melting Point—38° C. to 60° C.
4. Consistency—100 to 275
5. Residue on Ignition—0.10% max.
6. Organic Acids—none
7. Fixed Oils, Fats and Rosins—none To aid in selecting the proper grade of petrolatum for a given purpose and establishing specifications, the American Society for Testing Materials (ASTM) has developed many test methods. These test methods are widely accepted as standards throughout the industry. Tests include:

A. Melting Point (two types)—ASTM D938 is used to determine the congealing point of petrolatums. The congealing point is the temperature at which the material solidifies while cooling. USP melting (ASTM D-127) is used to determine the drop melting point of petrolatums. The melting point is determined to be the temperature at which the first drop of petrolatum drops from the thermometer while heated under specified conditions.

B. Consistency (Penetration)—ASTM D 937 determines the consistency (hardness or softness) of petrolatums; the lower the numerical value, the harder the petrolatum.

C. Viscosity—ASTM D 445 and ASTM D 2161 are methods for the measurement of the kinematic viscosity in centistokes and of the conversion to Saybolt viscosity in Saybolt Universal Seconds (SUS), respectively. Both methods measure mobility of molten petrolatum, usually @210° F. or 100° C.

D. Flash Point—ASTM D 92 is the procedure for determining the flash and fire points of petroleum products by the Cleveland Open Cup Tester.

Pharmaceutical grade petrolatums can find application in numerous applications. As such, their degree of purity is regulated by FDA requirements as spelled out in 21 CFR 172.880. The test procedure are detailed in the above code of Federal regulations.

Particularly preferred petrolatums are for this invention the Witco Chemical Companys' Protopet, Perfecta and Fonoline grades. Particularly useful in formulating the instant invention are petrolatums made by several companies including as the most examplary material Witco's Protopet line.

The Witco's Protopet line particularly combines a less greasy consistency, no odor and conforms to the the requirements of European and U.S. pharmacopoeias. Witco Protopet 1S has the following specifications and typical properties:

| SPECIFICATIONS FOR PROTOPET 1S | | |
|---|---|---|
| PROPERTIES | TEST METHOD TO DETERMINE | RANGE |
| Specific Gravity @ 60° C./25° C. | LATM 128 | 0.815/0.880 |
| Melting Point, °C. | ASTM D127 | 54.4/60.00 |
| Consistency | ASTM D937 | 180/210 |
| Residue on ignition | USP 23 | Passes |
| Organic Acids | USP 23 | Passes |
| Alkalinity | USP 23 | Passes |
| Acidity | USP 23 | Passes |
| Fixed oils, fats, and rosin | USP 23 | Passes |
| Color | USP 23 | Passes |
| Lovibond Color, 2' Cell, Y | IP 17 | 1.5/2.0 |
| Odor rating, panel average | LATM 093 | 1.0 Max. |

| TYPICAL PROPERTIES FOR WHITE PROTOPET 1S | | |
|---|---|---|
| PROPERTIES | TEST METHOD | TYPICAL VALUE |
| Congealing Point, °F. | ASTM D938 | 115/128 |
| Viscosity @ 210° F., SUS | ASTM D445 | 60/75 |
| Flash Point, COC, °F. | ASTM D92 | 420 min. |

Protopet 1S is a Petrolatum USP meeting requirements for USP 23 and FDA requirements as per 21 CFR 172.880.

A preferred embodiment of the instant invention contains about 50% of each of the two mentioned chemicals, with no additional additives other than PTFE and laboratory grade petrolatum. Additional chemicals which can be optionally added to form another inventive composition include narrow cut petroleum oils, and soluble hydrocarbon or phenolic resins.

An inventive composition containing chemicals in addition to the two above-mentioned basic ingredients has also proved useful. Such composition contains about 30–60% of the defined PTFE, about 25–45% pharmaceutical grade petrolatum, about 5–15% of a petroleum oil and about 5–15% of a hydrocarbon or phenolic resin. Percentages are in parts by weight taking into account all four ingredients in the final composition. A preferred type of petroleum oil are Magie Oils, printing ink oil solvents which are narrow-cut oils made and sold by Magie Brothers Inc., a Division of Pennzoil. The commercial products designated Magie Oil 47 and 470 are particularly preferred. Also useful are oils designated Amprint 231 from Total Petroleum and a similar line of oil products sold by Exxon Corp.

Hydrocarbon resins supplied by Neville Chemical Company, Pittsburgh, Pa., designated Nevchem 110 and Nevchem 140, are representative of a much larger variety of hydrocarbon resins useful in this invention. Also useful are resins sold by Arizona Chemical, Panama City, Fla. under the Betabrene and Betalite trademarks including Betabrene 255, and Resinall Corporation, North Carolina particularly Resinall trademark products designated Resinall 737, 747, 771 and 784. Phenolic resins are sold by Arizona Chemical under the Beckacite trademark including Beckatite 112, 115, 6004 and 6006.

The composition of this invention can be prepared with a wide variety of industrial mixing apparatus, including media mills, pug mills and paddle mixers. Other types of similarly useful apparatus are well known in the art. The starting chemicals can be added together in any order with the addition of petrolatum being added first and then the PTFE added as a preferred method. The mixture is then mixed, sheared or stirred for a period of time necessary to achieve satisfactory dispersion, which can be in some cases are no longer than a few minutes up to several hours. In many embodiments, the resultant mixture product will have the consistency of smooth light cream and be pumpable; often the mixture will have a creamy-white color as well, and will be non-gritty to the touch.

While "pourable" and "pumpable" are terms resisting precise definitions, they are given a working definition in this application as follows: (a) "pourable" in general means that the product exhibits 15,000 cps viscosity or less at 77° F., as measured with a Brookfield RVT Micometer @ 50 rpm employing a #4 spindle. Examples of products that are pourable include honey, molasses, and dishwasher liquids.

(b) "Pumpable" products exhibit 15,000 cps or less in viscosity at the shear rate of the pump. Pumpable products would include pourable products. Pumpable substances could be non-pourable (up to 75,000 cps) under static condition, but drop to 15,000 cps or less under shearing, because of their shear thinning response. Examples of pumpable products would include: construction pastes and grouts, mayonaisse-type substances, and soft shoe polishes.

While not wishing to be bound by theory, it is believed the ink additive formulation of the two above defined components creates a synergism where the specific petrolatum acts as both a booster and a carrier to the sintered PTFE. When used in the designated ratios the petrolatum "sets-up" and incompasses the PFTE, thereby unexpectly creating a hard barrier when used in ink formulations such as sheet fed, UV coatable and heatset inks.

Inks embodying the inventive compositions can be prepared utilizing machinery presently used to prepare existing ink formulations. While the relative amounts may vary, in general, the anti-abrasion composition will preferably make up from 0.1 to 10% by weight of the ink to be treated. Typically, more preferred use levels are 0.25% to 7% of the mixture composition to the ink system, the percent being based on the ink system to be affected. All types of inks can benefit from the inventive additive with heat set high quality inks most benefited.

Use of the composition of the invention is somewhat similar to the use of present, commercial, additives, and should in general require no special arrangements or apparatus when incorporating such compositions into ink systems. The anti-abrasion composition can be easily mixed into the ink system using conventional mixing equipment, such as medium and high-speed dispersing apparatus, and similar such mixture apparatus. Substantially less time and shear effort will be necessary to obtain effective dispersion of the inventive additives compared to many present-day commercial products. The additives are particularly useful in quality inks used for magazine covers and color advertising inserts commonly contained in magazines such as the National Geographic and Cosmopolitan.

The product of this invention, particularly those that are pumpable, can easily be dispersed in most ink liquids. The product can be added directly to a ink master batch by using an appropriate mixer.

Printing ink compositions using the present invention may be prepared by conventional techniques, e.g. by preparing a dispersion of the pigment in the ink vehicle and adding the additive. One preferable procedure for preparing ink compositions of the present invention is as follows:

a) Disperse the ink pigment in a vehicle, forming an ink formulation, and then b) disperse the inventive additive into the ink formulation, and then mixing the ink formulation for a brief period of time.

A preferred offset heatset printing ink composition may be made as follows:

a) Prepare a dispersion of 5–30 wt. percent ink pigment in 70–90 wt. percent of an ink vehicle; and b) add at a 2–5 wt. percent loading, based on the weight of the ink composition, the inventive polytetrafluoroethylene/petrolatum additive, incorporating it in the above dispersion, said additive comprising 40–60 wt. percent polytetrafluoroethylene, with the remainder petrolatum.

The inventive anti-abrasion/slip compositions provide substantially improved anti-abrasion properties, including better mar and slip, to a wide variety of printing inks compared to present additives. Since the additives are pumpable, elaborate heating and mixing apparatus is often not required, and the additives are as a result cheaper to use. The use of polyalphaolefin also decreases the cost of the additive, and allows diminished use of polytetrafluoroethylene in certain inks, which properties can result in a lower cost product. The following examples are illustrations designed to assist those skilled in the ink formulation and additive art to practice the present invention, but are not intended to limit the wide scope of the invention. Various modifications and changes can be made without departing from the essence and spirit of the invention. The various chemicals used in the examples are commercial materials, except for the inventive compositions.

EXAMPLES

Example 1

A number of ink formulations were prepared using compositions of the invention hereof. Composition A was a mixture of 50% granular PTFE of an average particle size of about 5 microns (which had been irradiated) and 50% laboratory grade petrolatum. Test results of a commercial wax anti-abrasion additive containing PTFE in dispersion available from Lawter International, designated Lawter Standard by Sun Printing Ink Company, was used for comparison. Tests were also run without any additive. The ink formulation used, before additive addition, was a zero grind, heat set ink obtained from Sun Chemical.

The additives were dispersed in the basic ink formulation using a Cowles mill at 2000 RPM for 15 minutes. The ink was then printed on cover stock, dried using a Sinvater drier and "rubbed" using a Sutherland rub test. The Sutherland test involved 50 strokes with a 4 pound weight covered with a paper substrate using a mechanical device known as a Sutherland rub tester. Gloss was measured using a gloss meter. The loading of additive used was 7% by weight. The results are reported in Table I. The densities using a McBeth densitometer were taken before the ink films were evaluated.

The gloss degradation determinations were rated as follows:

TABLE I

| Sample | Gloss -Amount of Loss- Degradation (before & after) | Density |
| --- | --- | --- |
| Lawter standard | 52 | 185 |
| Blank - No Additive | 62 | 185 |
| Composition A | 61.5 | 185 |

Discussion of Results

The results above show significantly less before and after effect on gloss using the inventive additive compared to a commercial standard. These results show that the gloss of the standard degrades more under pressure testing than the sample made according to the invention.

Example 2

The following tests was run to measure the amount of "rub-off" or deterioration that the ink formulation, with various additives, encountered.

A test for mar/rub resistance was performed. The mar/rub tests is one of the most critical measures of performance in printed ink testing. This testing simulates the printed package, whether it be a magazine cover, cardboard packaging (such as cereal boxes) or can labeling, etc. and carries its existence from manufacturing to shipping/receiving (such as movement inside the truck or carrier rubbing against one another) onto the produce store (which requires handle onto the shelves) and then finally to the consumer who chooses products according to his or hers aesthetics.

The test provides rub off from a clean substrate (paper stock) onto a printed stock normally using a 4 pound weight. The weight was set to provide stroking, which is a back and forth motion, for cover paper stock and provided 50 strokes. For such paper stock 50 strokes is usually considered sufficient. However, the amount of strokes can change according to customer specifications. Results are shown in Table II.

The results were determine through visual inspection and were compared to the standard. The rub-off result reported were based on visual observation of the amount of printed ink transferred to the printed substrate. The types of resistance were graded as below:

| Rub Mar Resistance | |
|---|---|
| Excellent (nearly no rub-off) | 5 |
| Good | 4 |
| Average | 3 |
| Below Average | 2 |
| Poor | 1 |

TABLE II

| Sample | Rub-Off Resistance |
|---|---|
| Lawter Standard | 3 |
| Composition A | 5 |

Discussion of Results

The inventive additives displayed nearly no rub-off and provided excellent results compared to the standard. The inventive samples in fact had very little or no rub off. The standard had a highly visable rub off.

Example 4

A number of tests were run for slip measurement. This test was to show the ratio of the frictional force resisting movement of the surface being tested to the force applied normal to the surface.

The apparatus used was a metal block sled with a plane lower surface 2–4" block and plane at 45° angle at a ratio of 1.5±0.50°/S. The weight was attached to a meter or gauge to indicate speed at which the weight slides on the substrate.

Slip resistance carries a great deal of importance for an anti-abrasion additive. Its testing works in conjunction with the anti-rub testing. If the slip is poor, for example, a scientist expects the additive to also have very poor rub resistance. It will also indicate that there is static which can cause problems in printing. If slip resistance is below average, for example, it could cause magazine insert print papers to adhere to each other, which is not desirable, and is unacceptable to a publisher.

Table III shows the inventive additives have excellent slip which compared to a standard product. The test result parameters were graded as follows:

| Slip (Angle°) Resistance | |
|---|---|
| Excellent | 15–17 |
| Good | 18–20 |
| Average | 21–23 |
| Below Average | 24–26 |
| Poor | 27 and above |

Misting tests were also run using state of the art techniques. Misting occurs when the additive in the finished formulation is printed on a press. When this happens, the print cylinder gives off a fine spray which carries onto the other impression cylinders. Most ink manufactureres add a fiberous additive to compensate for this problem. As can be seen from Table III, the inventive additives over-come this problem.

| Misting | |
|---|---|
| Excellent | 0% |
| Average | 1–5% |
| Poor | 6% and above |

TABLE III

| Sample | Slip (Angle°) Resistance | Misting |
|---|---|---|
| Lawter Standard | 22 | <6% |
| Composition A | 16 | <1% |

The foregoing background, description and examples have been set forth merely to illustrate the invention and are not intended to be limiting. Since many modifications and simple changes of the disclosed embodiments incorporating the spirit and substance of the invention may occur to persons skilled in the art, the invention should be construed to include everything within the scope of the appended claims, equivalents thereof and obvious variations thereof.

We claim:

1. An anti-abrasion additive for ink formulations comprising:
   a) about 40 to 70 parts by weight of sintered polytetrafluoroethylene and;
   b) about 30 to 60 parts by weight of one or more pharmaceutical grade petrolatums.

2. The additive of claim 1 wherein the polytetrafluoroethylene had been irradiated.

3. The additive of claim 1 wherein the polytetrafluoroethylene has an average particle size of from about 2 to about 10 microns.

4. The additive of claim 3 wherein the polytetrafluoroethylene has an average particle size of about 2 to about 5 microns.

5. The additive of claim 2 wherein the polytetrafluoroethylene is an irradiated sintered powder having an average particle size of from about 2 to about 5 microns.

6. The additive of claim 5 wherein the average particle size resulted from micronization of the irradiated sintered polytetrafluoroethylene.

7. The additive of claim 1 wherein the polytetrafluoroethylene is a virgin granular powder.

8. The additive of claim 1 wherein one or more of the pharmaceutical grade petrolatums has a specific gravity at 60° C./25° C. of between 0.815 and 0.880.

9. A pumpable anti-abrasion additive for ink formulations comprising:
   a) about 30 to 60 parts of weight of powdered sintered polytetrafluoroethylene, and
   b) about 25 to 45 parts by weight of one or more pharmaceutical grade petrolatums, and
   c) about 5 to 15 parts by weight of one or more petroleum oils and;
   d) about 5 to 15 parts by weight of one or more resins selected from the group consisting of hydrocarbon resins and phenolic resins.

10. The additive of claim 9 wherein the polytetrafluoroethylene is a virgin sintered powder with an average particle size of about 2 to about 5 microns.

11. The additive of claim 10 wherein the average particle size resulted from micronization performed by grinding of the sintered polytetrafluoroethylene.

12. The additive of claim 9 wherein the polytetrafluoroethylene is a irradiated sintered powder.

13. The additive of claim 9 wherein the polytetrafluoroethylene has been irradiated during sintering.

14. The additive of claim 9 wherein the polytetrafluoroethylene is a virgin granular powder.

15. An anti-abrasion additive for ink formulations comprising:
   a) about 40 to 70 parts by weight of sintered irradiated polytetrafluoroethylene of an average particle size of about 2 to about 10 microns; and
   b) about 30 to 60 parts by weight of one or more pharmaceutical grade petrolatums.

16. An ink formulation containing from about 0.1% to 10% by weight of an anti-abrasion additive comprising:
   a) about 40 to 70 parts by weight of irradiated sintered polytetrafluoroethylene; and
   b) about 30 to 60 parts by weight of one or more pharmaceutical grade petrolatums.

17. An ink formulation containing from about 0.1% to 10% by weight of a pumpable anti-abrasion additive comprising:
   a) about 30 to 60 parts by weight of irradiated sintered polytetrafluoroethylene, and
   b) about 25 to 45 parts by weight of one or more liquid pharmaceutical grade petrolatums, and
   c) about 5 to 15 parts by weight of one or more petroleum oils and;
   d) about 5 to 15 parts by weight of one or more resins selected from the group consisting of hydrocarbon resins and phenolic resins.

* * * * *